United States Patent
Jajtic et al.

(10) Patent No.: US 8,102,085 B2
(45) Date of Patent: Jan. 24, 2012

(54) CONVERTER-FED SINGLE STRAND SHORT STROKE LINEAR MOTOR

(75) Inventors: Zeljko Jajtic, München (DE); Markus Knorr, Augsburg (DE)

(73) Assignee: Siemens Aktiengesellschaft, München (DE)

( * ) Notice: Subject to any disclaimer, the term of this patent is extended or adjusted under 35 U.S.C. 154(b) by 152 days.

(21) Appl. No.: 12/520,308

(22) PCT Filed: Dec. 19, 2007

(86) PCT No.: PCT/EP2007/064190
§ 371 (c)(1),
(2), (4) Date: Jun. 19, 2009

(87) PCT Pub. No.: WO2008/077853
PCT Pub. Date: Jul. 3, 2008

(65) Prior Publication Data
US 2010/0026104 A1    Feb. 4, 2010

(30) Foreign Application Priority Data
Dec. 22, 2006  (DE) .......................... 10 2006 061 136

(51) Int. Cl.
*H02K 41/02* (2006.01)
(52) U.S. Cl. ............... 310/12.22; 310/12.01; 310/12.13; 310/12.24
(58) Field of Classification Search ............... 310/12.01, 310/12.13, 12.21–12.22, 12.24
See application file for complete search history.

(56) References Cited

U.S. PATENT DOCUMENTS

| 4,581,553 A * | 4/1986 | Moczala ..................... 310/12.22 |
| 4,945,268 A | 7/1990 | Nihei et al. |
| 6,239,516 B1 * | 5/2001 | Floresta et al. ............. 310/12.21 |
| 2003/0227269 A1* | 12/2003 | Fischperer ..................... 318/135 |
| 2004/0090128 A1* | 5/2004 | Kim et al. ........................ 310/12 |
| 2006/0072098 A1 | 4/2006 | Dams et al. |

FOREIGN PATENT DOCUMENTS

| CH | 93413 A | 3/1922 |
| DE | 695 01 106 T2 | 3/1998 |
| EP | 0 949 748 A1 | 10/1999 |
| WO | WO 94/26020 A1 | 11/1994 |
| WO | WO 9426020 A1 * | 11/1994 |

* cited by examiner

*Primary Examiner* — Quyen Leung
*Assistant Examiner* — Jose Gonzalez Quinones
(74) *Attorney, Agent, or Firm* — Henry M. Feiereisen; Ursula B. Day

(57) ABSTRACT

The invention relates to a short stroke linear motor. In order to improve the dynamics of such a short stroke linear motor, the primary part (12) of the motor is provided with a single-strand winding. The primary part (12) and the secondary part (1) have essentially the same pole pitch (tZ=tM). In this way, a very high motor torque is produced in a limited range of displacement. In order to be able to reach a plurality of working positions without an inactive intermediate position, a short stroke linear motor having a double-strand winding is additionally provided, both strands being operated at a phase difference of <90°. The pole pitch of the primary part and the secondary part are again essentially the same.

2 Claims, 4 Drawing Sheets

CONVERTER-FED SINGLE STRAND SHORT STROKE LINEAR MOTOR

CROSS-REFERENCES TO RELATED APPLICATIONS

This application is the U.S. National Stage of International Application No. PCT/EP2007/064190, filed Dec. 19, 2007, which designated the United States and has been published as International Publication No. WO 2008/077853 and which claims the priority of German Patent Application, Serial No. 10 2006 061 136.5, filed Dec. 22, 2006, pursuant to 35 U.S.C. 119(a)-(d).

BACKGROUND OF THE INVENTION

The present invention relates to a short stroke linear motor which is designed for a highly dynamic position control for very small stroke movements. Short stroke linear motors of this kind are used in machine tools for so-called eccentric turning such as is necessary, for example, for machining pistons of internal combustion engines. In eccentric turning, a very small (<<1 mm) but specific deviation from the circular shape is aimed for. This is achieved by an oscillating movement of the cutting tool synchronized with the rotational speed as the workpiece turns. To achieve high dynamics when eccentric turning, a linear motor with a high intrinsic acceleration value is required. According to the equation $a_{motor}=F_{motor}/m_{motor}$ (N/kg), this means a motor force which is as high as possible with minimum motor mass.

As a rule, three-strand synchronous linear motors are used as standard as controlled direct drives for the stroke movement of the cutting tool in machine tools for eccentric turning. A three-strand synchronous linear motor of this kind is reproduced in longitudinal section in FIG. 1. In order that the moved mass remains as small as possible, the cutting tool is moved by the secondary part 1 of the linear motor, as the secondary part 1 is lighter than the primary part 2 of the linear motor. The secondary part typically consists of a steel carrier plate 3 on which the permanent magnets 4 are fixed. These are aligned alternately from the secondary part 3 to the primary part 2 and vice versa.

In order to further increase the motor dynamics, the mass of the moved secondary part is minimized by optimizing the design with regard to geometry and stiffness. This optimization, with which a sufficiently small mass and high stiffness of the secondary part is achieved, often results in a technically elaborate design of the secondary part 1. In particular, complex machining is then required in many instances, and expensive materials must be used.

In its primary part 2, the standard three-phase synchronous linear motor reproduced in FIG. 1 has numerous teeth 5 which are aligned towards the secondary part 1 and are in each case encompassed by a coil 6. The linear motor specifically shown in FIG. 1 is distinguished by the following data:

Number_teeth: $N_z=12$
Number_active_magnets: $N_M=13$
Length of primary part: $L_{Fe}=N_z*\tau_z$
Tooth pitch: $\tau_z$
Magnet pitch: $\tau_M$
Pitch ratio: $\tau_z \neq \tau_M$
Number of strands: m=3 (symmetrical)
Motor terminals: 3 (U, V, W)
max. operating force: 100% $F_{nenn}$
min. operating force: 100% $F_{nenn}$ The magnets covered by the length of the primary part ($L_{Fe}=N_z*\tau_z$) are designated here as active magnets (number: $N_M$).

For multi-phase (m>1) linear motors, and therefore also for the three-phase linear motor in wound tooth technology shown in FIG. 1, the following conditions must be maintained:

$\tau_z \neq \tau_M$ $L_{Fe}=N_z \cdot \tau_M \pm n \neq \tau_M; n=1,2,3 \ldots$ The three-phase synchronous linear motor generates a constant force over the whole range of travel, which is achieved by the sinusoidal current characteristic. Depending on position, only one motor strand (e.g. Strand U) is ever in the optimum position to produce maximum force, and at this moment the other two motor strands (e.g. Strands V and W) are in a different pole position with respect to the magnets and do not utilize their current in an optimum manner. In short stroke applications (e.g. eccentric turning), the maximum range of travel $s_{max}$ is relatively small: $S_{max} \approx 1 \ldots 2$ mm or $s_{max} << \tau_m$. This means that the three-phase linear motor practically works at one operating point and does not provide the optimally achievable force, as not all motor strands are in the optimum pole position at the same time.

The strands of the standard synchronous linear motor are connected according to FIG. 2. A diagram as shown in FIG. 3 results for the currents of the individual phases U, V, W depending on the travel displacement x. For the synchronous linear motor with a number of strands m=3, the result is the usual phase shift of $\Delta\phi_{el}=120°$ el. for the three phases. At the same time, a constant force is produced over the travel displacement x and: $F_{max}(x)=F_{Nenn}$ and $F_{min}(x)=F_{Nenn}$.

SUMMARY OF THE INVENTION

The object of the present invention therefore consists in improving the dynamics of a short stroke linear motor.

The invention is based on the idea that, when the limits of minimization of the mass of the secondary part are reached, a further improvement of the drive dynamics in the machine tool is only possible if the motor force is increased in accordance with the above formula. To that effect, according to the invention, a short stroke linear motor is provided having a single-strand winding in the primary part which has a first pole pitch, and a secondary part which has a second pole pitch, the first pole pitch and the second pole pitch being essentially equal.

Furthermore, according to the present invention, a short stroke linear motor is proposed with a two-strand winding in the primary part which has a first pole pitch, and a secondary part which has a second pole pitch, the first pole pitch and the second pole pitch being essentially equal and the two strands of the primary part being operated so that their phase difference is less than 90°.

As a result of the motor design according to the invention, a better drive can be achieved for applications with short stroke movements (eccentric turning) compared with conventional solutions in that a higher motor force is produced for the same installation space and same mass. This enables better motor dynamics and a higher machining speed. In manufacture, the short stroke linear motor according to the invention differs from a standard motor only in the connection of the tooth coils. The short stroke motor can therefore be built from components (laminated core, coils, housing, connections etc.) of a standard motor, wherein no additional manufacturing effort is incurred and cost savings can be achieved.

Preferably, the short stroke linear motor is driven by a three-phase converter, the commutation position of which is specified to be at a point at which one of the three phase currents is zero. A normal converter can therefore be used for driving the short stroke linear motor.

Alternatively, it is also possible for the short stroke linear motor to be supplied from a DC regulator when only one phase or one strand is provided for the primary part. Consequently, the power supply for the short stroke linear motor can be chosen relatively independently.

If the short stroke linear motor with two-strand winding described above is used, then this has the advantage that it can also be reliably moved over a travel displacement $s > \tau_M$, as it also produces a forward propulsive force in positions where the force of a strand passes through zero. The primary part then has a first primary part half for a first of the two strands and a second primary part half for a second of the two strands. At the same time, the two primary part halves can be spaced apart from one another by a distance $\Delta x$ and each have the same pole pitch as the secondary part.

The distance $\Delta x$ avoids no forward propulsive force being obtained at certain positions.

Alternatively, the two primary part halves can be not spaced apart from one another and have the same pole pitch which however differs from the pole pitch of the secondary part. This also avoids no forward propulsive force occurring at certain points.

BRIEF DESCRIPTION OF THE DRAWING

The present invention is explained in more detail with reference to the attached drawings, in which.

DETAILED DESCRIPTION OF PREFERRED EMBODIMENTS

The exemplary embodiments described in more detail below represent preferred embodiments of the present invention.

Figure 1:
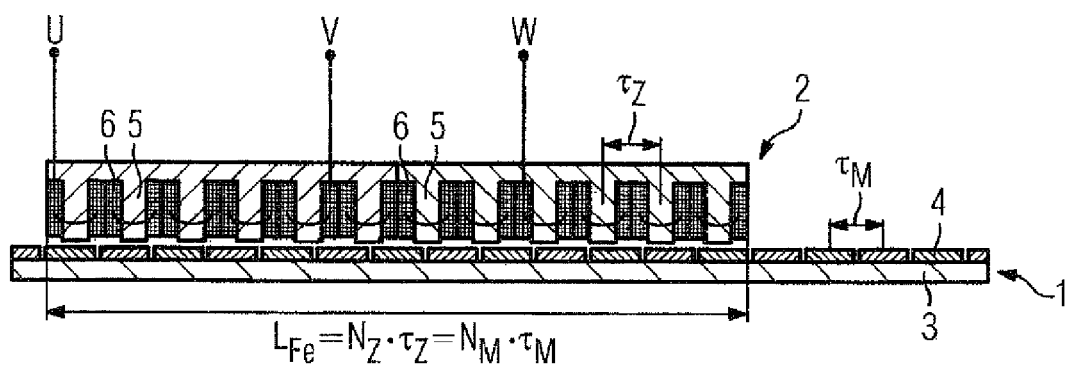
FIG. 1 shows a longitudinal section through a standard three-phase synchronous linear motor.
Figure 2:
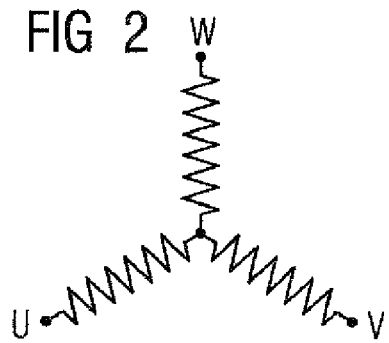
FIG. 2 shows a circuit diagram of the strands of the motor of FIG. 1.
Figure 3:
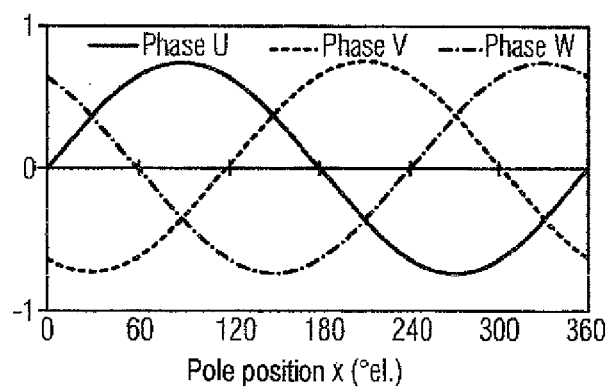
FIG. 3 shows a phase current diagram of the motor of FIG. 1.
Figure 4:
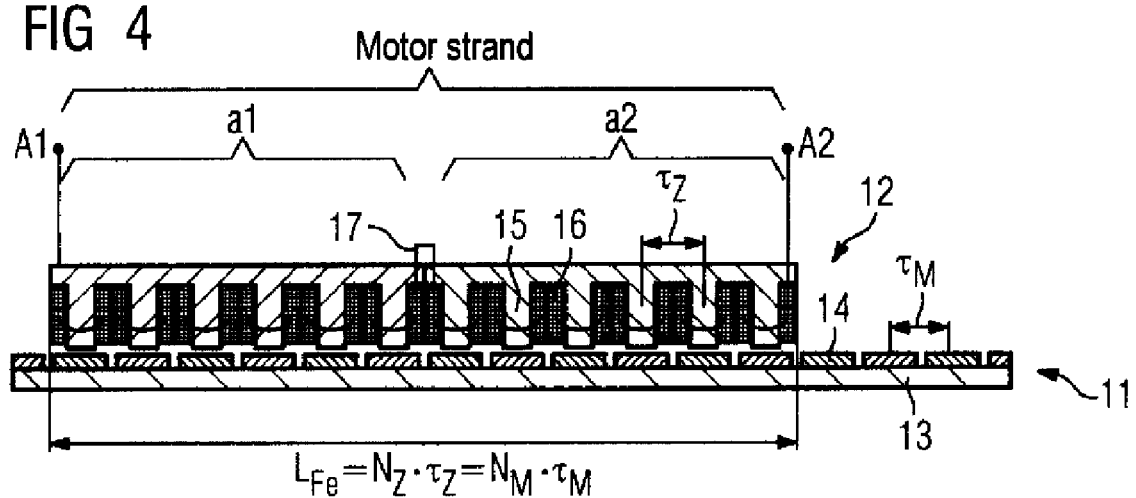
FIG. 4 shows a longitudinal section through a short stroke linear motor according to a first embodiment.

According to a first exemplary embodiment, which is shown in FIG. 4, the short stroke linear motor according to the invention has a different secondary part 11 from the standard motor of FIG. 1. The primary part 12, on the other hand, is the same. The secondary part 11 with the magnets 14 on the carrier plate 13 now has the same magnet pitch $\tau_m$ as the tooth pitch $\tau_z$ of the primary part 12. In detail, the short stroke linear motor has the following characteristics:

Number_teeth: $N_z = 12$
Number_active_magnets: $N_M = 12$
Length of primary part: $L_{Fe} = N_z * \tau_z$
Tooth pitch: $\tau_z$
Magnet pitch: $\tau_M$
Pitch ratio: $\tau_z = \tau_M$
Number of strands: m=1
Midpoint_Y: Not brought out
Motor terminals: 2 (A1, A2)
max. operating force: ca. 173% $F_{nenn, 3\sim}$
min. operating force: 0% $F_{nenn, 3\sim}$ Furthermore, the single-phase short stroke linear motor in wound-tooth technology satisfies the following conditions:

$$\tau_z = \tau_M$$

$$L_{Fe} = N_z * \tau_M$$

Figure 5:
FIG. 5 shows a circuit of the strand of the motor of FIG. 4.

The primary part has only a single motor strand between the terminals A1 and A2. The corresponding circuit can be seen from FIG. 5.

In the example of FIG. 4, the primary part 12 is made up of two part strands a1 and a2. The two are connected symbolically by means of a bracket 17, which is electrically equivalent to the connecting point of FIG. 5. Otherwise, in principle, the structure of the primary part with its teeth 15 and its coils 16 is the same as the primary part 2 of FIG. 1.

The short stroke linear motor according to FIG. 4I in which the magnet pitch $\tau_M$ corresponds exactly to the tooth pitch $\tau_z$ and in which the motor winding is designed without a midpoint, can only generate force over a limited range of travel. This maximum range of travel $s_{max}$ corresponds to the magnet pitch $\tau_M$. It is limited by two zero-force positions ("force zero-crossover points"). At these points, no force can be produced by the current flowing through the winding.

Figure 6:
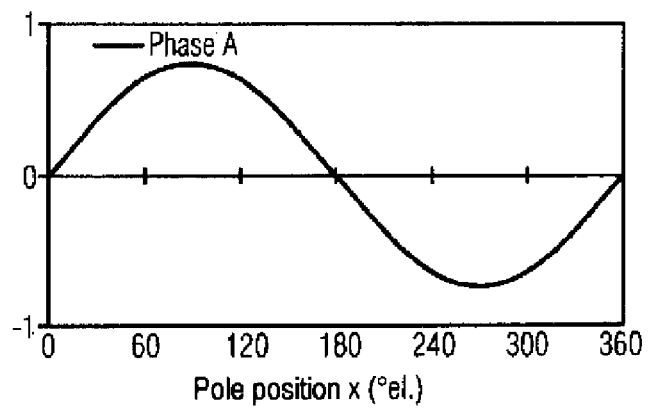
FIG. 6 shows a phase current diagram of the motor of FIG. 4.

The short stroke linear motor according to this first embodiment is distinguished by the fact that the mechanical motor design is the same as a standard three-phase linear motor (same housing and same fixing) and only the winding is connected differently. All coils of the motor winding are therefore in an optimum position to generate force at the same time, enabling the current to be utilized more effectively. The object that a higher resulting nominal force can be achieved than with the three-phase linear motor while the power loss remains constant is therefore achieved. However, the range of travel is limited due to the force zero-crossover points. This is shown in FIG. 6, from which with the short stroke linear motor with a number of strands m=1 ($\Delta\phi_{el} = 0°$ el.) it can be seen that the force becomes zero at regular intervals. A constant force is not therefore produced over the travel displacement x, but instead: $F_{max}(x) \approx 1.73\, F_{nenn}$ and $F_{min}(x) = 0$. The achievable motor force can be increased to 173% of the original nominal force by the matching of the pitches ($\tau_z = \tau_M$) according to the invention and the special connection of the winding. This results in a considerable improvement of the dynamics of the synchronous linear motor.

Figure 7:
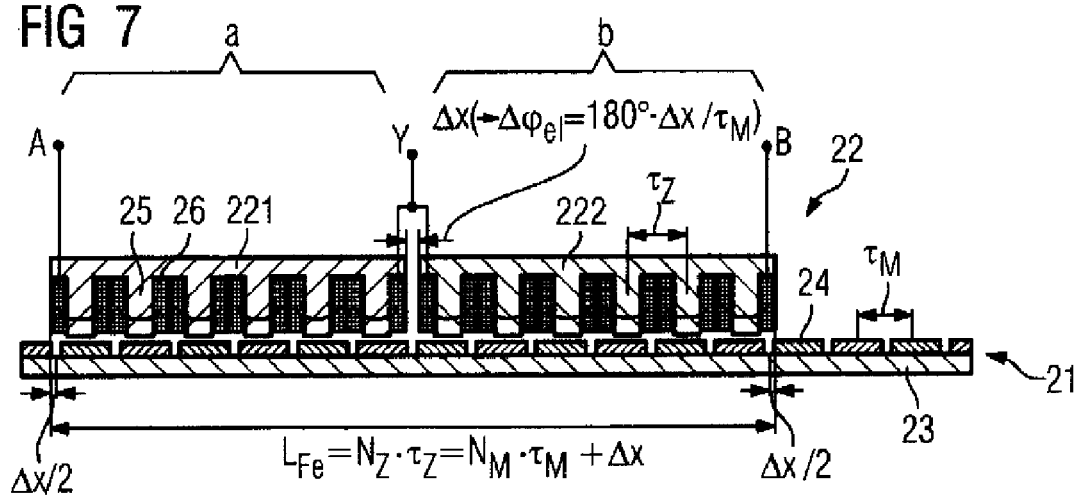
FIG. 7 shows a longitudinal section through a short stroke linear motor according to a second embodiment of the present invention.

A second embodiment of a short stroke linear motor according to the invention is shown in FIG. 7. The secondary part 21 with its carrier plate 23 and its magnets 24 again corresponds to that of the exemplary embodiment of FIG. 1 with the difference that the number of magnets covered by the primary part has been reduced from 13 to 12: $N_{PM} = 12$. The primary part 22 has two part strands a and b. These are connected to one another by means of the terminals A and B and the center tap Y according to the circuit of FIG. 8. The two primary part halves 221 and 222 corresponding to the part strands a and b are spaced apart from one another with an offset $\Delta x$. As with the previous exemplary embodiments, the teeth 25 of the primary part 22 are fitted with coils 26.

In detail, the short stroke linear motor shown in FIG. 7 has the following data:
Number_teeth: $N_z$=12
Number_active_magnets: $N_M$=12
Length of primary part: $L_{Fe}=N_z*\tau_z+\Delta x$
Tooth pitch: $\tau_z$
Magnet pitch: $\tau_M$
Pitch ratio: $\tau_z=\tau_M$
Number of strands: m=2 (asymmetrical)
Midpoint_Y: Brought out
Motor terminals: 3 (A, Y, B)
max. operating force: ca. 165 . . . 170% $F_{nenn, 3\sim}$
min. operating force: ca. 35 . . . 50% $F_{nenn, 3\sim}$ Furthermore, this results in the following conditions for this two-phase short stroke linear motor in wound-tooth technology:

$$\tau_z=\tau_M$$

$$L_{Fe}=Nz\cdot\tau M\pm\Delta x; \Delta x<<\tau_M$$

The offset $\Delta x$ corresponds to a small phase shift $\Delta\phi_{el}$ between the two part strand windings a and b. Here: 0° el.<$\Delta\phi_{el}$<<90° el., e.g. $\Delta\phi_{el}$=30° el. The offset $\Delta x$ can also be obtained if the two primary part halves 23, 24 are produced from a single-piece section of sheet metal. This results in a simpler fixing.

With this short stroke linear motor with a number of strands m=2, the two strands are operated with a phase shift of $\Delta\phi_{el}$<21 90° el. This leads to the motor being able to generate force in any position, as current flows through the part strand a and/or the part strand b as FIG. 9 clearly shows. There is no zero-force position in the whole range of travel, as a result of which the short stroke motor can move over a range of minimum force (formerly "force zero-crossover") to a next "regular" working range of its own volition. This is necessary for machining stepped eccentric shafts, for example. In the "regular" working ranges or working positions, current passes through both part strands a, b and therefore a higher motor force is still generated than with the normal three-phase linear motor, as the motor force deviates only slightly from the ideal value as a result of this small phase shift. By way of example, the following values are therefore achieved: $F_{max}(X)\approx 1.65\ F_{nenn}$ and $F_{min}(X)\approx 0.35\ F_{nenn}$.

Advantageously, there is therefore a large range of travel for this motor without force zero-crossover points. The mechanical motor design differs from the standard three-phase linear motor due to the offset $\Delta x$ of the two primary part halves 23, 24.

Figure 8:
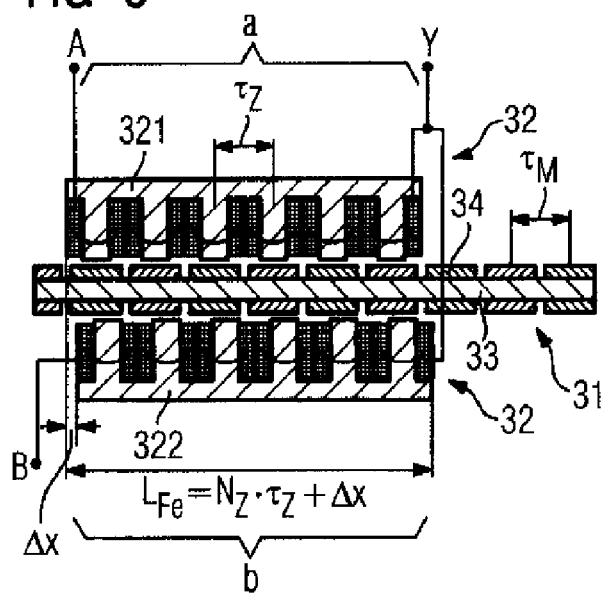
FIG. 8 shows a longitudinal section through a short stroke linear motor in double-comb arrangement.

FIG. 8 reproduces a longitudinal section of a third exemplary embodiment of the short stroke linear motor according to the invention. This short stroke linear motor is designed using the well-known "double comb arrangement". The secondary part 31 is fitted with magnets 34 on both sides of the carrier plate 33 and is located between the primary halves 321 and 322 of the primary part 32. The electrical circuit of the short stroke linear motor in double-comb arrangement is exactly the same as that of the short stroke linear motor according to the second exemplary embodiment of FIG. 7. Advantageously, the short stroke linear motor in double-comb arrangement according to FIG. 8 has a very compact and low-mass design of the secondary part 32. A further advantage of this linear motor is the greatly reduced resulting attractive force between primary part 32 and secondary part 31.

Figure 11:
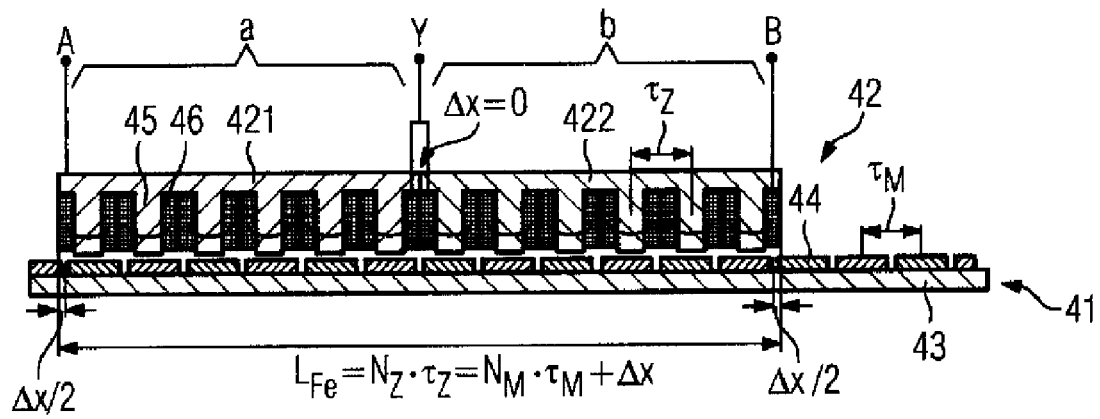
FIG. 11 shows a longitudinal section through a short stroke linear motor according to a third embodiment of the present invention.

A fourth exemplary embodiment of the short stroke linear motor according to the invention is reproduced in longitudinal section in FIG. 11. Once again, the secondary part 41 is the same as that of the previous motors with the exception that the following now applies for the pitch ratio: $\tau_z\neq\tau_M$. Although, like the motor according to FIG. 7, the primary part 42 likewise consists of two primary part halves 421, 422 corresponding to the part strands a and b, the two parallel part halves 421, 422 are not spaced apart from one another, i.e. $\Delta x$=0. Each of the teeth 45 of the primary part 42 has a special winding 46.

Figure 9:
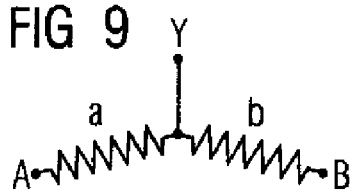
FIG. 9 shows a circuit of the strands of the motor of FIG. 7.

As in the example of FIG. 7, the connections of the part strands a, b are made by terminals A, B, Y, which once again results in the circuit of FIG. 9. The main difference compared with the motor of FIG. 7 is therefore that the two primary part halves 421, 422 are arranged without an offset and furthermore the primary and secondary parts have an unequal pitch, i.e. $\tau_z\neq\tau_M$. In detail, the motor shown in FIG. 11 therefore has the following characteristics:
Number_teeth: $N_z$=12
Number_active magnets: $N_M$=12
Length of primary part: $L_{Fe}=N_z*\tau_z$
Tooth pitch: $\tau_z$
Magnet pitch: $\tau_M$
Pitch ratio: $\tau_z\neq\tau_M$
Number of strands: m=2 (asymmetrical)
Midpoint_Y: Brought out
Motor terminals: 3 (A, Y, B)
max. operating force: ca. 165 . . . 170% $F_{nenn, 3\sim}$
min. operating force: ca. 35 . . . 50% $F_{nenn, 3\sim}$ This two-phase short stroke linear motor in wound-tooth technology satisfies the following conditions:

$$\tau_z\approx\tau_M$$

$$L_{Fe}=N_z\cdot\tau_M+\Delta x; \Delta x<<\tau_M$$

Figure 10:
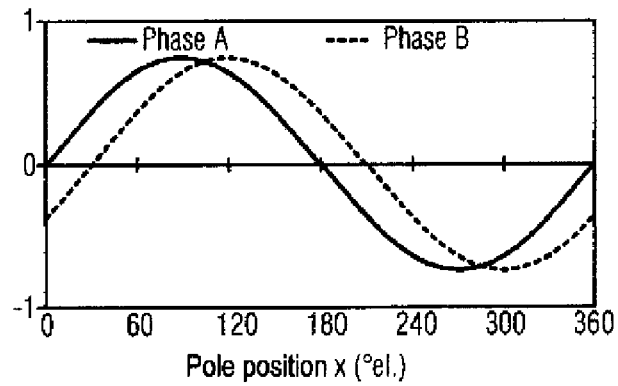
FIG. 10 shows a phase current diagram of the motor of FIG. 7.

As current flows in the same way as in the previous example according to FIG. 10 and there is a phase shift of $\Delta\phi_{el}$<<90° el., force can be generated over the whole range of travel by passing current through the part strand a and/or b. There is no zero-force position or "force zero-crossover point". This third exemplary embodiment therefore makes use of the advantages of the two previous exemplary embodiments, as the motor is implemented with a phase shift between two part strands a and b. The prerequisite that $F_{min}$>0 is once again satisfied and an unlimited range of travel can be obtained. The phase shift $\Delta\phi_{el}$ is achieved by the unequal pitch $\tau_z\neq\tau_M$, whereby the centers of gravity of the part strands a and b are offset by $\Delta x$>0 with respect to one another. This is equivalent to the discrete offset of the laminations according to the second exemplary embodiment. The primary part 42 therefore retains the mechanical design of a standard three-phase linear motor. In a particularly advantageous manner, not only can a large range of travel without force zero-crossover points be achieved, but also the mechanical motor design of the standard three-phase linear motor can be adopted with this exemplary embodiment.

Furthermore, the unequal pitch ratio ($\tau_z\neq\tau_M$) can be specifically optimized for a minimally disturbing cogging effect.

Figure 12:
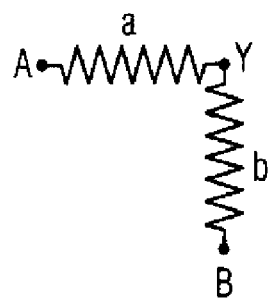
FIG. 12 shows a circuit of the strands of the motor of FIG. 10.
Figure 13:
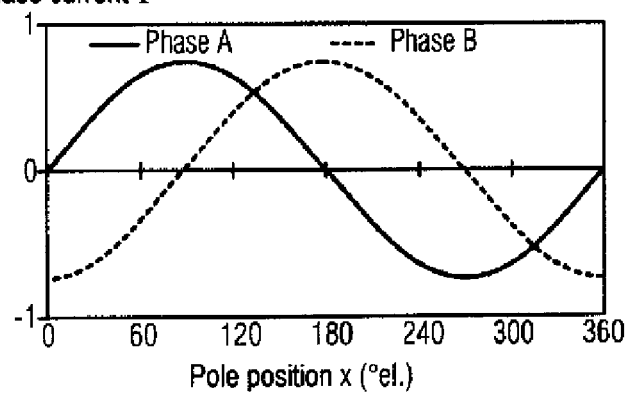
FIG. 13 shows a phase current diagram of the motor of FIG. 10.

Purely by way of example, a "real" two-strand motor with phase shift $\Delta\phi_{el}$=90° el. (cf. also FIG. 13) is shown schematically in FIG. 12 in order to clarify differences compared with the short stroke linear motor as a "pseudo" two-strand motor (0$\Delta\phi_{el}$<<90° el.).

From the point of view of force utilization, a "real" two-strand motor ($\Delta\phi_{ei}$=90° el.) is comparable with a three-strand motor and provides no increase in force in short stroke applications.

What is claimed is:

1. A short stroke linear motor comprising:
a primary part having a plurality of teeth with a first pole pitch, each tooth surrounded by a separate coil, wherein the separate coils are electrically connected with adjoining coils so as to form a single-strand winding having two terminals,
a secondary part having a second pole pitch substantially identical to the first pole pitch, wherein the plurality of teeth of the primary part are aligned towards the secondary part, and
a three-phase converter supplying an electric current to the two terminals of the single-strand winding from two of the three phases at a predetermined commutation position located at a point where a current in a third of the three phases is zero.

2. The short stroke linear motor of claim 1, wherein the linear motor has an interdigitated structure.

* * * * *